(12) United States Patent
Thom et al.

(10) Patent No.: US 8,375,221 B1
(45) Date of Patent: Feb. 12, 2013

(54) FIRMWARE-BASED TRUSTED PLATFORM MODULE FOR ARM PROCESSOR ARCHITECTURES AND TRUSTZONE SECURITY EXTENSIONS

(75) Inventors: Stefan Thom, Snohomish, WA (US); Jeremiah Cox, Redmond, WA (US); David Linsley, Seattle, WA (US); Magnus Nystrom, Sammamish, WA (US); Himanshu Raj, Issaquah, WA (US); David Robinson, Seattle, WA (US); Stefan Saroiu, Redmond, WA (US); Rob Spiger, Seattle, WA (US); Alastair Wolman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 11 days.

(21) Appl. No.: 13/193,945

(22) Filed: Jul. 29, 2011

(51) Int. Cl.
*G06F 11/30* (2006.01)
*G06F 7/04* (2006.01)
(52) U.S. Cl. ............................. 713/189; 726/6
(58) Field of Classification Search .................. 713/189; 726/2
See application file for complete search history.

(56) References Cited

U.S. PATENT DOCUMENTS

| | | | |
|---|---|---|---|
| 7,360,253 B2 | 4/2008 | Frank et al. | |
| 7,506,380 B2 | 3/2009 | Hunter et al. | |
| 7,565,553 B2 | 7/2009 | Hunter et al. | |
| 7,836,299 B2 | 11/2010 | England et al. | |
| 7,836,309 B2 | 11/2010 | Holt et al. | |
| 7,908,483 B2 | 3/2011 | Iliev et al. | |
| 7,921,286 B2 | 4/2011 | Wooten | |
| 7,934,096 B2 | 4/2011 | Thom et al. | |
| 8,156,298 B1 * | 4/2012 | Stubblefield | 711/163 |
| 8,185,750 B2 * | 5/2012 | Bade et al. | 713/191 |
| 2003/0041250 A1 * | 2/2003 | Proudler | 713/182 |
| 2006/0161784 A1 | 7/2006 | Hunter et al. | |
| 2006/0236127 A1 | 10/2006 | Kurien et al. | |
| 2007/0006306 A1 * | 1/2007 | Seifert et al. | 726/22 |
| 2008/0148388 A1 | 6/2008 | Wooten et al. | |
| 2008/0319779 A1 | 12/2008 | Hughes et al. | |
| 2009/0055641 A1 | 2/2009 | Smith | |
| 2009/0172639 A1 * | 7/2009 | Natu et al. | 717/120 |
| 2009/0249053 A1 * | 10/2009 | Zimmer et al. | 713/2 |

(Continued)

OTHER PUBLICATIONS

Santos, et al., "Trusted Language Runtime (TLR): Enabling Trusted Applications on Smartphones", Retrieved at <<http://research.microsoft.com/en-us/um/people/ssaroiu/publications/hotmobile/2011/tlr.pdf>>, Hotmobile, Mar. 1-2, 2011, pp. 6.

(Continued)

*Primary Examiner* — Techane Gregiso
(74) *Attorney, Agent, or Firm* — Lyon & Harr, LLP; Mark A. Watson (57) ABSTRACT

A "Firmware-Based TPM" or "fTPM" ensures that secure code execution is isolated to prevent a wide variety of potential security breaches. Unlike a conventional hardware based Trusted Platform Module (TPM), isolation is achieved without the use of dedicated security processor hardware or silicon. In general, the fTPM is first instantiated in a pre-OS boot environment by reading the fTPM from system firmware or firmware accessible memory or storage and placed into read-only protected memory of the device. Once instantiated, the fTPM enables execution isolation for ensuring secure code execution. More specifically, the fTPM is placed into protected read-only memory to enable the device to use hardware such as the ARM® architecture's TrustZone™ extensions and security primitives (or similar processor architectures), and thus the devices based on such architectures, to provide secure execution isolation within a "firmware-based TPM" without requiring hardware modifications to existing devices.

17 Claims, 6 Drawing Sheets

U.S. PATENT DOCUMENTS

| | | | |
|---|---|---|---|
| 2010/0031370 | A1 | 2/2010 | Ellison et al. |
| 2010/0082984 | A1 | 4/2010 | Ellison et al. |
| 2010/0082987 | A1 | 4/2010 | Thom et al. |
| 2010/0086134 | A1 | 4/2010 | Ureche et al. |
| 2010/0088523 | A1 | 4/2010 | Wooten |
| 2010/0088525 | A1 | 4/2010 | Ureche et al. |
| 2011/0087896 | A1 | 4/2011 | Thom et al. |
| 2011/0099367 | A1 | 4/2011 | Thom et al. |
| 2011/0099625 | A1 | 4/2011 | Thom et al. |
| 2011/0167503 | A1 | 7/2011 | Horal et al. |
| 2011/0296488 | A1* | 12/2011 | Dandekar et al. .............. 726/1 |
| 2012/0117381 | A1* | 5/2012 | Lo et al. .................. 713/156 |

OTHER PUBLICATIONS

Anand, et al., "Threat-Adaptive Architectures for Trusted Platform Modules in Secure Computing Systems", Retrieved at <<http://ieeexplore.ieee.org/stamp/stamp.jsp?tp=&arnumber=5612177>>, IEEE International Conference on Electro/Information Technology, May 20-22, 2010, pp. 6.

Schramm, et al., "The Benefits of Combining Trusted Computing with Virtualization Techniques", Retrieved at <<http://ieeexplore.ieee.org/stamp/stamp.jsp?tp=&arnumber=5599638>>, International Conference on Applied Electronics, Sep. 8-9, 2010, pp. 4.

Parno, Bryan Jeffrey., "Trust Extension as a Mechanism for Secure Code Execution on Commodity Computers", Retrieved at <<http://citeseerx.ist.psu.edu/viewdoc/download?doi=10.1.1.167.393&rep=rep1&type=pdf>>, May, 2010, pp. 203.

Zhang, et al., "Trusted Code Remote Execution through Trusted Computing and Virtualization", Retrieved at <<http://ieeexplore.ieee.org/stamp/stamp.jsp?tp=&arnumber=4287470>>, Eighth ACIS International Conference on Software Engineering, Artificial Intelligence, Networking, and Parallel/Distributed Computing, vol. 1, Jul. 30, 2007-Aug. 1, 2007, pp. 39-44.

Hohl, et al., "Safeguarding Personal Data with DRM in Pervasive Computing", Retrieved at <<http://www.vs.inf.ethz.ch/events/sppc04/papers/sppc04_hohl.pdf>>, Retrieved Date: Mar. 18, 2011, pp. 8.

Linsley, et al., "Hardware Supported Virtualized Cryptographic Service", U.S. Appl. No. 12/750,141, filed Mar. 30, 2010, pp. 42.

Thom, et al., "Globally Valid Measured Operating System Launch with Hibernation Support", U.S. Appl. No. 12/938,363, filed Nov. 2, 2010, pp. 43.

Wittenberg, et al., "Cryptographic Device that Binds an Additional Authentication Factor to Multiple Identities", U.S. Appl. No. 12/894,391, filed Sep. 30, 2010, pp. 36.

Zhang, et al., "Software Activation using Digital Licenses", U.S. Appl. No. 12/968,021, filed Dec. 14, 2010, pp. 33.

* cited by examiner

FIRMWARE-BASED TRUSTED PLATFORM MODULE FOR ARM PROCESSOR ARCHITECTURES AND TRUSTZONE SECURITY EXTENSIONS

BACKGROUND

1. Technical Field

A "Firmware-Based TPM" or "fTPM" provides various techniques for using hardware such as the ARM® architecture's TrustZone™ extensions and security primitives to provide secure execution isolation for a Trusted Platform Module (TPM) within a "firmware-based TPM" that can be implemented within devices using existing ARM®-based processor architectures or similar hardware.

2. Background Art

As is well known to those skilled in the art, a conventional Trusted Platform Module (TPM) is a hardware device or "chip" that provides a secure crypto-processor. More specifically, a typical TPM chip generally offers facilities for the secure generation of cryptographic keys, and limitation of their use, in addition to a hardware pseudo-random number generator. It also includes capabilities such as "remote attestation" and sealed storage. Remote attestation is intended to create a practically unforgeable hash key summary of a particular hardware and software configuration. The extent of the summary is decided by the components involved in measuring the hardware and software configuration. This allows a third party to verify that the software and hardware configuration complies with some set policy. "Binding" encrypts data using a TPM endorsement key, a unique RSA key burned into the TPM chip during its production, or another trusted key descended from it. "Sealing" encrypts data similar to binding, but in addition specifies the state in which the TPM chip must be in order for the data to be decrypted or "unsealed."

TPM chips are also used to authenticate hardware devices. Since each TPM chip has a unique and secret RSA key burned in as it is produced, it is capable of performing platform authentication. For example, it can be used to verify that a system seeking access is an expected or authorized system. Clearly, pushing the security down to the hardware level of a system, by using discrete TPM chips in conjunction with corresponding security software, provides more protection than a software-only solution. However even when a TPM chip is used, keys are still vulnerable once exposed by the TPM chip to applications, as has been illustrated in the case of a conventional cold boot attack.

Many conventional solutions for implementing a TPM for a computing system involve integrating a discrete hardware TPM chip into the motherboard or system board of such computing systems. Unfortunately, such solutions face several challenges. For example, integrating TPM chips into a typical motherboard design results in an increased bill of materials (BOM) cost in the order of about $1 to $2 per system. However, even such relatively low per-device costs can add to a very large total considering the tremendous volume of computing devices being manufactured around the world. Another challenge often associated with conventional TPM chips is that discrete TPMs are generally not optimized for energy efficiency, and can impact the power budget for low-power systems (e.g., portable computing devices, PDA's, tablets, netbooks, mobile phones, etc.). Further, due to BOM constraints, discrete TPM chips are often implemented with relatively slow (and thus low cost) processors which negatively impacts or potentially prevents certain usage scenarios.

Consequently, because TPMs are generally considered to be optional system components, the additional monetary and power costs for including a discrete TPM in a system often leads to the exclusion of such devices during the manufacturing process. TPMs are therefore not ubiquitous which makes it difficult for software or operating system developers to invest substantial resources in broad TPM usage scenarios. Another issue affecting broad TPM usage scenarios is that many conventional discrete TPMs are not compatible with some form factors (e.g., phones, PDA's, tablets, etc.). In fact, many conventional devices such as mobile phones and tablet type computers don't generally use discrete TPMs, and in some cases may not have the appropriate interconnects (e.g., an LPC bus) to support the use of discrete TPMs with the system-on-a-chip (SoC) driving devices such as phones or tablets.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

Trust is a reliance on the integrity of a person or thing. For device users, trust in a device is established by the guarantee that only code that conforms with a set policy can execute on the device. To deliver strong integrity protections and defend against malicious infection and modifications, a combination of hardware and software is used. Operating systems (OS) such as Microsoft® Windows® have previously used a Trusted Platform Module (TPM) as the hardware component for delivering this platform integrity to various systems. Unfortunately, the TPM's broad adoption has met resistance due to a number of reasons, including, for example, the additional Bill of Materials (BOM) cost of adding a discrete TPM component to the motherboard, the cost and time of redesigning a particular device to provide the appropriate interface for connecting or adding a TPM to such devices, etc.

In general, a "Firmware-Based TPM" or "fTPM," as described herein, addresses the costs associated with including a TPM in hardware such as ARM® System On Chip (SoC) platforms, or similar platforms, to implement a virtually zero-cost "firmware TPM", thereby reducing the BOM cost of the system, lowering the overall power consumption of the device, and enabling a wide variety of TPM usage scenarios across a wide range of ARM®-based devices. In contrast to conventional techniques, the fTPM provides a software interface to the security extension functionality integral to processors such as ARM® processors without requiring a hardware TPM module to be used in the computing device in which a trusted computing environment is enabled by the fTPM.

In other words, in contrast to conventional techniques, the fTPM enables a trusted execution environment in computing devices comparable to that provided by a hardware TPM without using a hardware TPM. Further, the software embodying the fTPM can be uploaded, flashed, or otherwise stored or written to the firmware or protected non-volatile memory of many existing computing devices in order to "upgrade" those devices to enable the use of TPM functionality, again without requiring any hardware modifications to such devices.

More specifically, any TPM implementation ensures that it preserves its code and data integrity and confidentiality from all other software running in the system to prevent a wide variety of potential security breaches. Isolation can be implemented with a dedicated security processor (at the cost of adding silicon) or using an elevated execution privilege level offered by the hardware architecture. The Firmware-Based TPM described herein is first instantiated in a pre-OS boot environment by reading the fTPM from system firmware or firmware accessible memory or storage and placing the fTPM into protected memory of the device along with a simple "Monitor."

Note that the terms "protected memory", "protected storage", and similar terms used herein are specifically defined as storage that cannot be read or modified by untrusted components such as the Normal World. Normal operations can neither read nor write both the data and functionality contained within protected storage. For example, the OS operates in Normal World and cannot read or write the protected storage but the "Secure World" including fTPM can. One way to set up this protected memory is for hardware (e.g., a memory or eMMC storage controller) to partition a region of storage (e.g., TrustZone protected memory or Replay Protected Memory Block) for use by the Secure World only. Since the OS is running in the "Normal World" and not in the "Secure World", the OS cannot access any memory marked as secure unless it uses certain protected mechanisms (e.g., a Secure Monitor Call (SMC) instruction that is relayed to the fTPM as described in detail herein).

Note that the "Monitor" described herein is specifically defined as an interface which enables communications from the "Normal World" to be received by the fTPM operating in the "Secure World" while keeping the "Secure World" isolated from the "Normal" World. Note also that "Secure World" and "Normal World" operating modes of architectures such as ARW-based architectures and TrustZone™ extensions are well known to those skilled in the art and will not be discussed in detail herein. TrustZone™ extensions are useful in that they provide a common security infrastructure across multiple platforms. However, it should be understood that the fTPM described herein is operable with any TPM-based security architectures. Examples of such alternative security architectures (i.e., alternative trust execution environments) include, but are not limited to TI OMAP-based architectures, M-Shield-based architectures, x86 system management mode (SMM), etc.

Once instantiated, the Firmware-Based TPM then uses existing ARM®-based architectures and TrustZone™ extensions to enable execution isolation for ensuring code and data integrity and confidentiality and the isolation of cryptographic operations (and storage) from access by the "Normal World" via a firmware-based "virtual dedicated security processor". In other words, the fTPM described herein is read from system firmware (or other source) and placed into protected memory and uses the ARM® architecture's TrustZone™ extensions and security primitives to provide secure execution isolation within a "firmware-based TPM" that can be implemented within existing ARM®-based architectures and thus the devices based on such architectures without requiring hardware modifications to existing devices.

Consequently, one advantage of the Firmware-Based TPM is that it uses existing ARM® TrustZone™ extensions for implementing the execution isolation needed by the TPM without actually requiring a TPM chip or other hardware. In contrast, various conventional systems have either used a discrete TPM or added a dedicated security processor to the SoC. Unfortunately, both of these approaches incur additional cost to the system. TrustZone™, however, is a nearly ubiquitous feature across the broad set of high-end ARM® SoC roadmaps but remains largely unused. When it is leveraged, TrustZone™ has been mainly used in niche, vertical, solutions for secure payments, mobile banking, DRM, etc. Therefore, the use of TrustZone™ by the Firmware-Based TPM to implement a TPM in the firmware of existing devices adds significant value to existing devices without requiring hardware modifications to such devices. As such, TPM ubiquity across multiple SoC platforms is enabled by the Firmware-Based TPM described herein.

In view of the above summary, it is clear that the Firmware-Based TPM described herein provides various techniques for using hardware such as the ARM® architecture's TrustZone extensions and security primitives to provide secure execution isolation within a "firmware-based TPM" that can be implemented within existing ARM®-based architectures and thus the devices based on such architectures. In addition to the benefits described above, other advantages of the Firmware-Based TPM will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, as with a conventional hardware TPM, a "Firmware-Based TPM" or "fTPM," as described herein, ensures that it preserve its code and data integrity and confidentiality from all other software running in the system to prevent a wide variety of potential security breaches as well as enabling a wide variety of security application (e.g., cryptographic applications, secure random number generation, disk/file encryption, password authentication, etc.). Isolation can be implemented with a dedicated security processor (at the cost of adding silicon) or using an elevated execution privilege level offered by the hardware architecture. Advantageously, the Firmware-Based TPM described herein does not require the physical hardware of a conventional hardware TPM to enable the same secure code execution as a hardware TPM.

In other words, in contrast to conventional techniques, the fTPM provides a software-based interface to the security extension functionality integral to processors such as ARM® processors to enable a trusted execution environment (also referred to as a trusted computing environment) in computing devices that is comparable to that provided by a hardware TPM without using a hardware TPM. Further, the software embodying the fTPM can be uploaded, flashed, or otherwise stored or written to the firmware or protected non-volatile memory of many existing computing devices in order to "upgrade" those devices to enable the use of TPM functionality, again without requiring any hardware modifications to such devices.

Note that the terms "protected memory", "protected storage", and similar terms used herein are specifically defined as storage that cannot be read or modified by untrusted components such as the Normal World. Normal operations can neither read nor write both the data and functionality contained within protected storage. For example, the OS operates in Normal World and cannot read or write the protected storage but the "Secure World" including fTPM can. One way to set up this protected memory is for hardware (e.g., a memory or eMMC storage controller) to partition a region of storage (e.g., TrustZone protected memory or Replay Protected Memory Block) for use by the Secure World only. Since the OS is running in the "Normal World" and not in the "Secure World", the OS cannot access any memory marked as secure unless it uses certain protected mechanisms (e.g., a Secure Monitor Call (SMC) instruction that is relayed to the fTPM as described in detail herein).

For example, in various embodiments, the software embodying the fTPM can simply be included in a typical BIOS or firmware update to immediately provide such devices with TPM capabilities upon reboot. Note that the various processes and techniques for updating system firmware and/or BIOS for computing devices are well-known to those skilled in the art, and will not be described in detail herein. Consequently, for purposes of explanation, the following discussion will assume that the software embodying the fTPM has already been provided to the firmware of the computing device upon which the fTPM is to be used for enabling TPM functionality.

In particular, the fTPM is first instantiated in a pre-operating system (OS) boot environment by reading the fTPM from system firmware or firmware accessible memory or storage and placing the fTPM into protected memory of the device. Note that in various embodiments, the pre-OS boot environment (or firmware) automatically verifies the integrity of the fTPM code (e.g., by validating a "signature" of the fTPM code) prior to allowing that code to be placed into protected memory to ensure it has not been tampered with. Note also that while the fTPM can also be loaded or instantiated into protected memory following OS boot, it is easier to ensure overall system security by instantiating the fTPM in the pre-OS boot environment. Further, while the fTPM can be loaded or instantiated into non-protected memory, there will generally be no guarantee of security in such cases. Note that various processes for writing data (e.g., the fTPM in the example described herein) into protected memory prior to, during, or after system boot is well known to those skilled in the art and will not be described herein.

Once instantiated, the Firmware-Based TPM then uses existing hardware such as ARM®-based architectures and TrustZone™ extensions (or similar technology) to enable execution isolation for ensuring security of code execution via a firmware-based "virtual dedicated security processor". In other words, the Firmware-Based TPM described herein is placed into protected memory that allows the ARM® architecture's TrustZone™ extensions and security primitives (or similar technology) to provide secure execution isolation within a "firmware-based TPM" that can be implemented within existing ARM®-based architectures and thus the devices based on such architectures. Note that TrustZone™ extensions are useful in that they provide a common security infrastructure across multiple platforms. It should also be noted that for purposes of explanation, the fTPM will generally be described in the context of an implementation using the ARM® architecture's TrustZone™ extensions and security primitives. However, it should be understood that the fTPM described herein is operable with a wide variety of TPM-based security architectures.

Advantageously, this secure execution isolation is provided by the fTPM without requiring hardware modifications to existing devices and without requiring a physical hardware TPM. Consequently, the fTPM is both easier and less expensive to implement within a wide variety of devices without actually requiring a TPM chip or other hardware. In addition, the fTPM is fully compatible with all TPM standards. As such, the fTPM can be used in any implementation that would normally require a hardware TPM. Further, from the point of view of software or hardware making use of the fTPM, the fTPM is indistinguishable from a hardware-based TPM.

Further, it is important to note that since the fTPM is simply written to protected memory during instantiation, multiple copies or versions of the fTPM can be written to separate regions of protected memory thereby enabling separate TPM capability for each separate processor, co-processors, CPUs in a multi-processor or multi-CPU system, and other separate heterogeneous or asymmetrical processor architectures. Note that SoC's and other new system architectures are adding additional cores with different capabilities than the traditional collection of identical cores and that the fTPM is operable with such devices and hardware. Similarly, in the case of virtual environments (e.g., virtual machines) running within a single system, this capability allows separate and isolated TPM capability to be provided to each virtual environment. Note that as is well understood by those skilled in the art, a virtual machine (VM) is a software implementation of a machine (i.e., a computer) that executes programs like a physical machine. Virtual machines are generally separated into two major categories, based on their use and degree of correspondence to any real machine. In particular, a system virtual machine provides a complete system platform which supports the execution of a complete operating system (OS), while a process virtual machine is designed to run a single program, which means that it supports a single process.

Note that for purposes of explanation, the following discussion will generally focus on a single instance of the fTPM within a single processor system. However, in view of the preceding discussion, it should be clear that multiple instances of the fTPM may be implemented within multi-processor or multi-core systems other heterogeneous or asymmetrical processor architectures, and within systems running one or more virtual environments such as a virtual machine (VM). Note also that the following discussion refers to the TrustZone™ "Secure World" and "Normal World" operating modes. These operating modes are well known to those skilled in the art and will not be discussed in detail herein.

1.1 System Overview:

As noted above, the "Firmware-Based TPM" or "fTPM" provides various techniques for using the ARM® architecture's TrustZone™ extensions and security primitives to provide secure execution isolation within a firmware-based TPM that can be implemented within existing ARM®-based architectures (or similar technologies) and thus the devices based on such architectures without requiring hardware modifications to existing devices. Note that the term "device" in the following discussion will generally refer to a general computing device including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc., within which the fTPM is being instantiated to provide that device with TPM capabilities.

Figure 1:
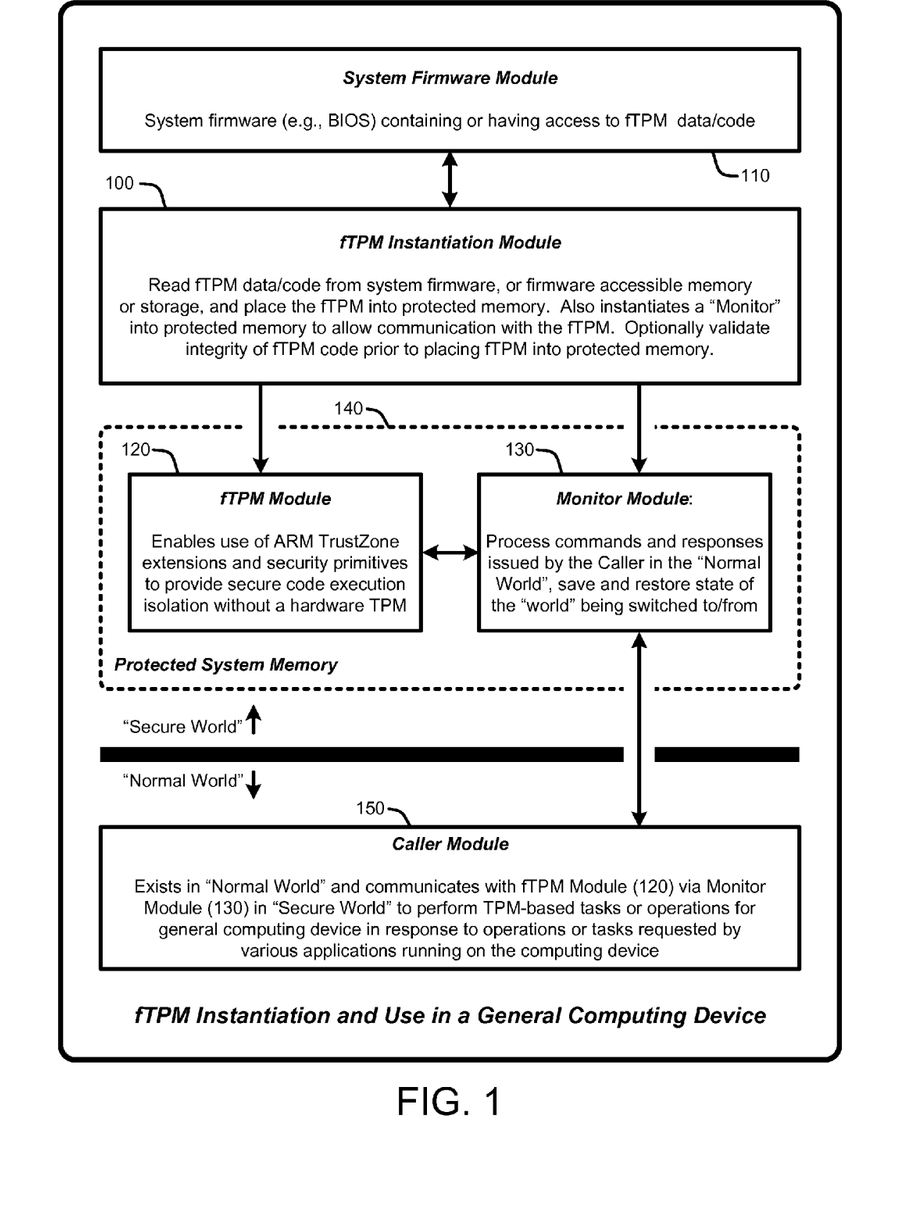
FIG. 1 illustrates a general architectural and operational flow diagram for instantiating a "Firmware-Based TPM" into protected memory of a general computing device, as described herein.

The processes summarized above are illustrated by the general system diagram of FIG. 1. In particular, the system diagram of FIG. 1 illustrates the interrelationships between program modules for implementing various embodiments of the fTPM within a device, as described herein. Furthermore, while the system diagram of FIG. 1 illustrates a high-level view of various embodiments of the fTPM, this figure is not intended to provide an exhaustive or complete illustration of every possible embodiment of the fTPM as described throughout this document.

In general, as illustrated by FIG. 1, the processes enabled by the Firmware-Based TPM begin operation by using an fTPM instantiation module 100 to read fTPM data/code (i.e., the executable software embodiment of the fTPM) from system firmware 110, or firmware accessible memory or storage, of the device on which the fTPM is to be enabled. The fTPM instantiation module 100 then loads or places the fTPM into a protected memory location of system memory 140 to enable an instantiation of the fTPM within the device. Note also that in various embodiments, the fTPM instantiation module 100 also automatically verifies the integrity of the fTPM code (e.g., by validating a "signature" of the fTPM code) prior to allowing that code to be placed into protected memory to ensure it has not been tampered with. The fTPM instantiation module 100 also instantiates a "Monitor" (i.e., "monitor module 130) into protected system memory 140 to allow communication with the fTPM. Note that the "Monitor" described herein is specifically defined as an interface which enables communications from the "Normal World" to be received by the fTPM operating in the "Secure World" while keeping the "Secure World" segregated from the "Normal World."

In general, the monitor module 130 processes commands and responses issued by a Caller (i.e., caller module 150) in the "Normal World", and saves and restores the state of the "World" being switched to/from. More specifically, the Monitor (i.e., monitor module 130) intercepts commands or requests (i.e. a requested "operation") from the caller module 150. The monitor module 130 then passes those commands or requests to the fTPM module 120, which in turn executes the operation in its Secure World environment. The fTPM module 120 then writes the response from the executed operation to shared memory and returns to the monitor module 130 which then restores the system back to Caller (i.e., caller module 150) in the Normal World environment. Finally, the caller module 150 (or other application) retrieves the fTPM response from shared memory.

In other words, in general, the caller module 150 exists in the "Normal World" and communicates with fTPM module 120 via the monitor module 130 in the "Secure World" to perform TPM-based tasks or operations for the general computing device in response to tasks or operations requested via the caller module 150 by various applications running on OS (or pre-OS boot environment) of the computing device.

2.0 Operational Details of the Firmware-Based TPM:

The above-described program modules are employed for implementing various embodiments of the Firmware-Based TPM. As summarized above, the Firmware-Based TPM provides various techniques for using hardware such as the ARM® architecture's TrustZone™ extensions and security primitives to provide secure execution isolation within a "firmware-based TPM" that can be implemented within existing ARM®-based architectures and thus the devices based on such architectures without requiring hardware modifications to existing devices.

The following sections provide a detailed discussion of the operation of various embodiments of the Firmware-Based TPM, and of exemplary methods for implementing the program modules described in Section 1 with respect to FIG. 1. In particular, the following sections provide examples and operational details of various embodiments of the Firmware-Based TPM, including: an architectural overview of the fTPM; system initialization with the fTPM; "Caller" dependent on operating context; synchronous operation, asynchronous operation; and implementing an ARM® TrustZone™ enabled fTPM within a general computing device.

2.1 Architectural Overview of the fTPM:

As noted above, the Firmware-Based TPM-based processes described herein provide various techniques for using hardware such as the ARM® architecture's TrustZone™ extensions and security primitives to provide the execution isolation required by a TPM within a "firmware-based TPM," also referred to herein as an "fTPM," that can be implemented within existing ARM®-based architectures and thus the devices based on such architectures.

More specifically, the fTPM provides a firmware TPM within existing hardware by leveraging the ARM® architecture TrustZone™ extensions available on any ARM® based SoC platform. As is well known to those skilled in the art, TrustZone™ provides a secure execution environment (termed "Secure World") that is strongly isolated from the other components in the system, such as the Windows® operating system (OS) and a UEFI pre-boot environment, running in the normal execution environment (termed Normal World). Note that the UEFI (Unified Extensible Firmware Interface) is a well-known specification that defines a software interface between an operating system and platform firmware. Each TrustZone™ enabled fTPM instance includes a minimal Trusted Computing Base (TCB) that provides hardware isolation mechanisms and a secure boot loader which bootstraps the particular fTPM instance from the firmware to protected system memory (see discussion of FIG. 1, above), thereby providing a protected environment comparable to a conventional hardware-based TPM but without the added cost or complexity of the additional hardware required by the conventional hardware-based TPM.

2.2 System Initialization with the fTPM:

In general, as discussed above with respect to FIG. 1, during system initialization, the platform's fTPM implementation is installed from system firmware (e.g., BIOS or other system firmware) into protected memory of the device along with a simple Monitor into the TrustZone™ Secure World before the processor switches into Normal World operating mode. As discussed above with respect to FIG. 1, the simple Monitor (i.e., monitor module 130) performs two tasks:

1) Processing commands/responses issued by the Caller in the Normal World. Note that in most scenarios, the Caller is either boot firmware or an operating system driver as discussed in further detail below.
2) Saving and restoring the state of the World being switched to/from.

In general, the communication interface between the Caller running in the Normal World and the fTPM instance running in the Secure World is a synchronous or asynchronous shared memory based interface. The Caller uses a Secure Monitor Call (SMC) instruction to enter the Monitor and both synchronous and asynchronous I/O are supported in various embodiments. Note that SMC instructions are a well-known instruction type associated with ARM® TrustZone™ technologies, and as such, SMC instructions will not be described in detail herein.

Figure 2:
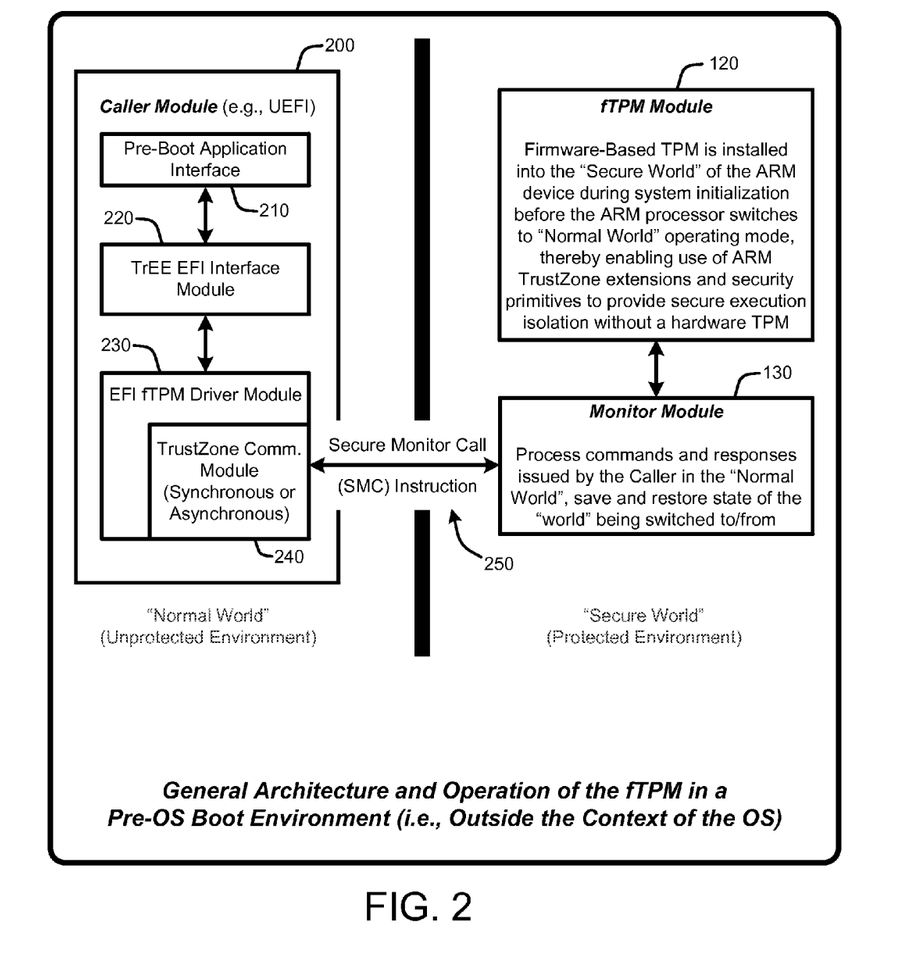
FIG. 2 illustrates a general architectural and operational flow diagram for using a "Firmware-Based TPM" in a pre-OS boot environment, as described herein.
Figure 3:
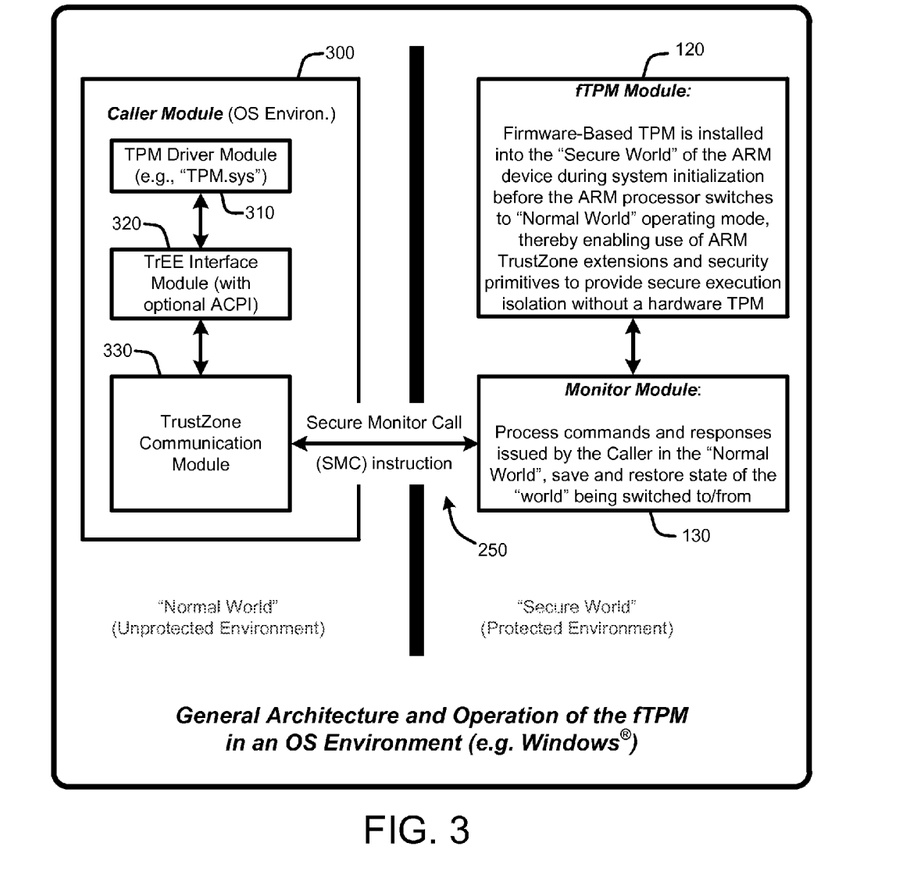
FIG. 3 illustrates a general architectural and operational flow diagram for using the "Firmware-Based TPM" in an OS environment following system boot, as described herein.

2.3 "Caller" Dependent on Operating Context:

As shown in FIG. 2 and FIG. 3, the Firmware-Based TPM uses a different "Caller" depending on whether the current operating context is a pre-OS boot environment or an OS environment. Note that the following discussion assumes that the fTPM has already been loaded or instantiated into protected memory of the device, as discussed above.

For example, as illustrated by FIG. 2, in a tested embodiment, within a UEFI pre-OS boot environment, the Caller 200 is a UEFI fTPM driver. However, it must be understood that the use of a UEFI fTPM driver is not a requirement of the fTPM, and that the use of a UEFI fTPM driver is simply one method for initiating pre-OS communications with the fTPM module 120 in the Secure World. Thus, assuming the use of a UEFI fTPM driver, the UEFI fTPM driver of the Caller 200 exposes the Trusted Execution Environment (TrEE) UEFI protocol to pre-boot applications such as the Windows® boot manager and other Windows® OS loaders. Note that TrEE UEFI protocols are well-known to those skilled in the art, and will not be described in detail herein. Note also that the fTPM described herein is not limited to use with Windows® type operating systems, and that other operating systems (e.g., LINUX, UNIX, iOS, OS X, Chrome, Android, etc.) are also operable with the fTPM described herein.

In general, as illustrated by FIG. 2, in a pre-OS boot environment a Caller module 200 (e.g., UEFI) is used to communicate with the fTPM module 120 loaded into protected system memory to provide various TPM-based capabilities to the device. Communication between the Caller module 200 (existing in the unprotected environment of the "Normal World" and the fTPM module 120 (existing in the protected environment of the "Secure World") is performed using a Secure Monitor Call (SMC) instruction 250 which uses monitor module 130 to intercept and pass communications between the fTPM module 120 and the Caller module 200. As noted above, during initialization of the fTPM module 120 and the monitor module 130 are installed into system protected memory from system firmware or other firmware accessible memory or storage.

More specifically, in various embodiments, in the pre-OS boot environment, when using a UEFI-based implementation, the Caller module 200 includes one or more pre-boot applications 210 and an interface module 220 in communications with an fTPM driver module 230. In the exemplary embodiment illustrated by FIG. 2, the interface module 220 is implemented using a conventional TrEE EFI interface for enabling communications between the pre-boot applications and the fTPM driver module 230. Further, in the exemplary embodiment illustrated by FIG. 2, the fTPM driver module 230 is implemented using an EFI interface that further includes a TrustZone™ communications module 240 that enables synchronous or asynchronous communications between the Caller module 200 and the Monitor module 130 via SMC instructions 250, as discussed above. In addition, it should be noted that an fTPM active in the pre-OS boot environment can transfer information to the OS environment by writing that information to shared memory that is then accessed in the OS environment following system boot.

In contrast, as illustrated by FIG. 3, within the OS environment, the Caller module 300 includes a newly defined "Trusted Execution Environment" (TrEE) interface module 320 that, in various embodiments, is optionally implemented using an Advanced Configuration and Power Interface (ACPI). Assuming a Windows®-based OS, the TrEE interface module 320 provides access to the fTPM for all kernel services, including the well-known "TPM.sys" device driver 310 of the Windows® OS which is designed to allow applications to access the TPM functionality of hardware TPMs. Communication between the Caller module 300 and the Monitor module 130 is enabled by a TrustZone™ Communication module 330 via SMC instructions 250.

Figure 4:
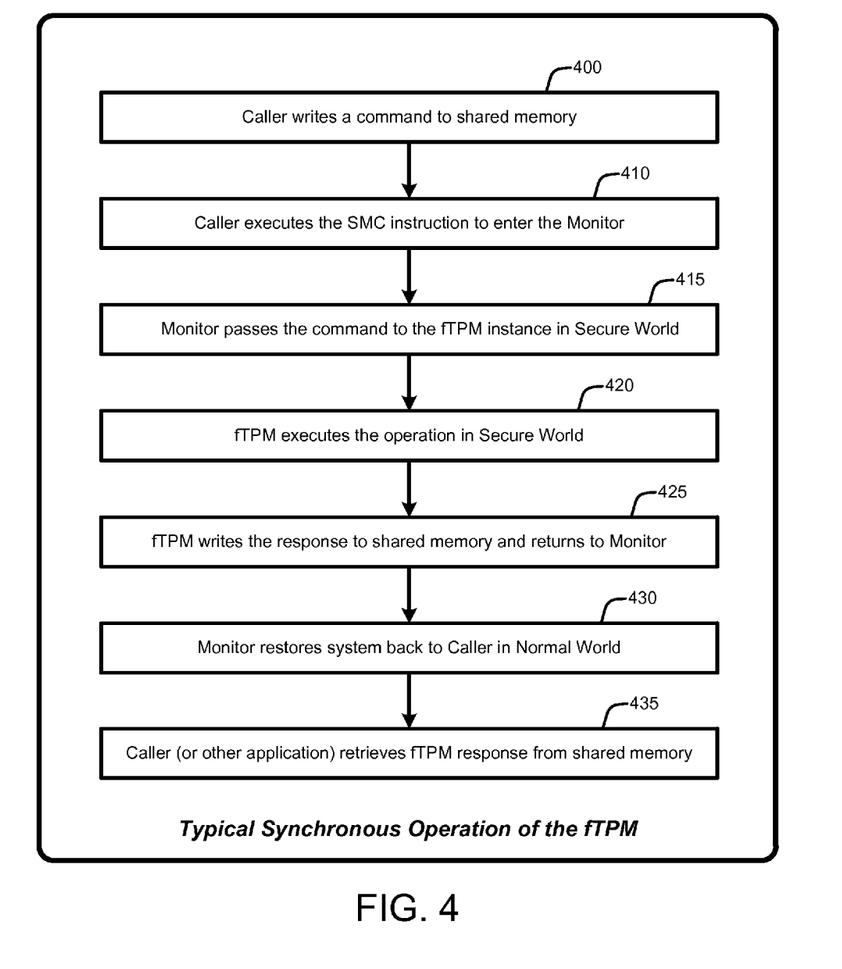
FIG. 4 provides a flow diagram that illustrates an example of typical synchronous operation of the "Firmware-Based TPM", as described herein FIG. 5 provides a flow diagram that illustrates an example of typical asynchronous operation of the "Firmware-Based TPM", as described herein

2.4 Synchronous Operation:

As illustrated by FIG. 4, in a typical synchronous operation scenario, the following steps are performed in the sequence shown:

1) Caller writes a command to shared memory (400).
2) Caller executes the SMC instruction to enter the Monitor (410).
3) Monitor passes the command to the fTPM instance in Secure World (415).
4) fTPM executes the operation in Secure World (420). Note that in the case of a processor having two or more cores or sub-processors, one or more of those cores sub-processors can be specifically dedicated to TPM operations while leaving the other cores free for other operations or tasks.
5) fTPM writes the response to shared memory and returns to Monitor (425).
6) Monitor restores system back to Caller in Normal World (430).
7) Caller (or other application) retrieves fTPM response from shared memory (435).

Figure 5:
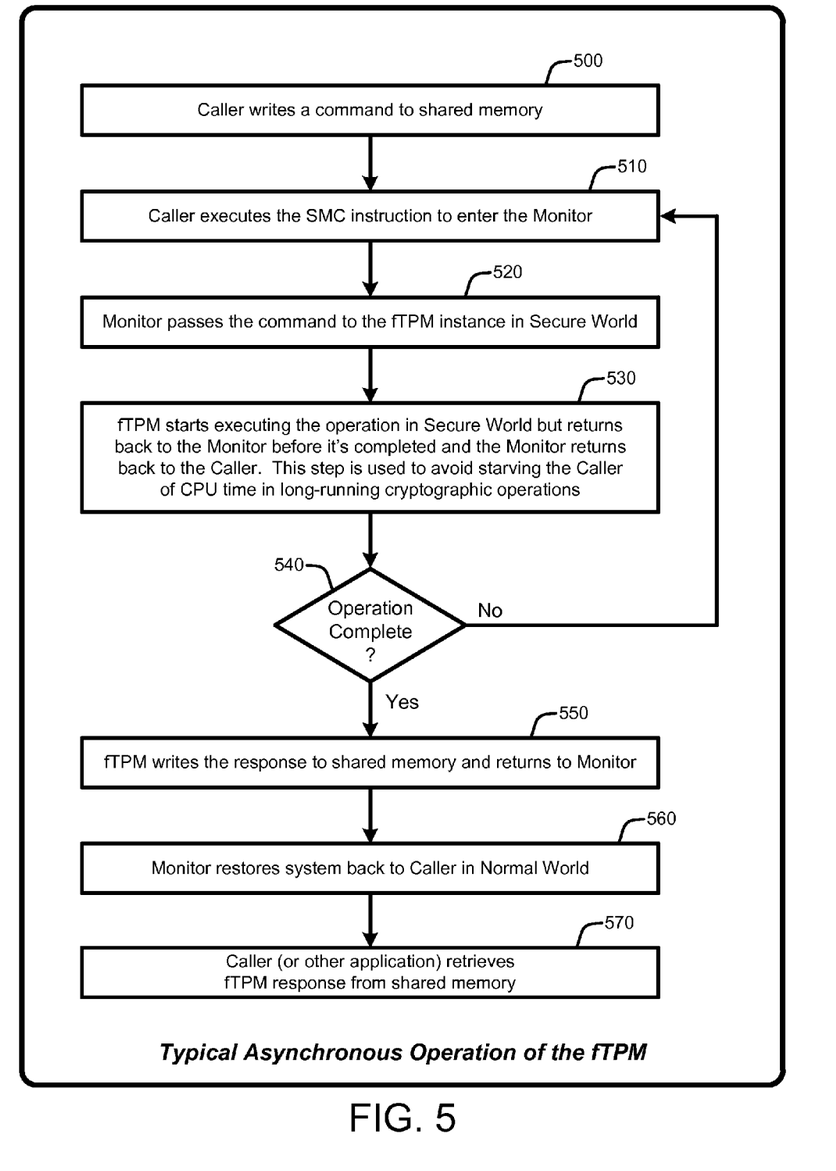

2.5 Asynchronous Operation:

As illustrated by FIG. 5, in a typical asynchronous operation scenario, the following steps are performed in the sequence shown:

1) Caller writes a command to shared memory (500).
2) Caller executes the SMC instruction to enter the Monitor (510).
3) Monitor passes the command to the fTPM instance in Secure World (520).
4) fTPM starts executing the operation in Secure World but returns back to the Monitor before it's completed and the Monitor returns back to the Caller. This is needed to avoid starving the Caller of CPU time in long-running cryptographic operations (530).
5) Check to see if operation is complete (540), if not then Caller loops through steps 2-4 to provide the fTPM instance CPU cycles for executing within Secure World until the requested operation is complete. Note that in the case of a processor having two or more cores or sub-processors, one or more of those cores or sub-processors can be specifically dedicated to TPM operations while leaving the other cores free for other operations or tasks.

6) fTPM writes the response to shared memory and returns to Monitor (550).
7) Monitor restores system back to Caller in Normal World (560).
8) Caller (or other application) retrieves fTPM response from shared memory (570).

2.6 Implementing an ARM® TrustZone™ Enabled fTPM:

Implementing an ARM® TrustZone™ enabled fTPM makes use of hardware primitives within the processor that include, but not limited to:

1) Hardware acceleration for cryptographic algorithms (e.g. AES, RSA, SHA-x, etc.);
2) Hardware based random number generation (RNG); and
3) Accessing non-volatile storage, preferably isolated, for storing secrets.

Advantageously, many conventional ARM® SoCs and similar processors already have these features included as hardware primitives. Therefore, the Firmware-Based TPM described herein enables a conventional ARM® SoC, or other security-enabled processor, to be configured with a fTPM such that after the OS is initialized, it has access to a fully functional TPM with virtually no additional BOM cost to the device. This enables hardware such as ARM® SoC platforms to perform a variety of tasks, including, but not limited to:

1) Natively supporting Windows® features such as Bitlocker®, virtual Smartcards, Measured Boot, etc.;
2) Delivering better power efficiency vs. discrete TPM solutions in ARM®-based devices;
3) Reducing overall system BOM cost and device design complexity since integration of a hardware TPM is no longer necessary; and
4) Enabling a wide variety of new TPM usage scenarios in power-sensitive devices given the improved efficiency relative to devices using a conventional discrete TPM.

Figure 6:
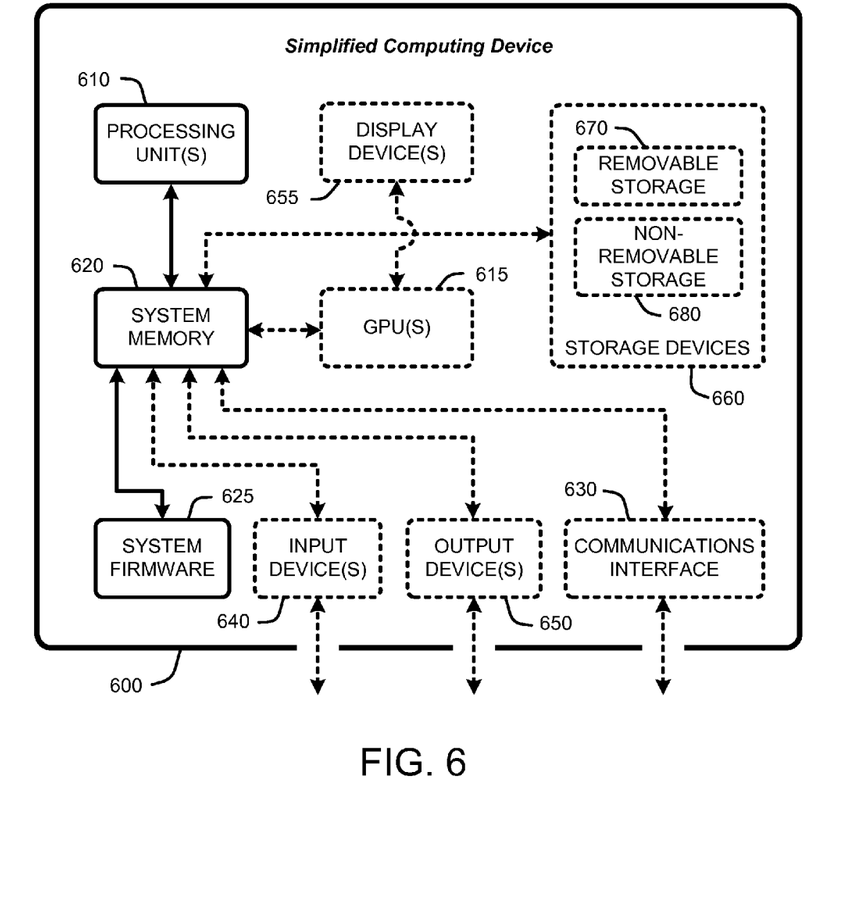
FIG. 6 is a general system diagram depicting a simplified general-purpose computing device having simplified computing and I/O capabilities for use in implementing various embodiments of the Firmware-Based TPM, as described herein.

3.0 Exemplary Operating Environments:

The fTPM described herein is operational within numerous types of general purpose or special purpose computing system environments or configurations. FIG. 6 illustrates a simplified example of a general-purpose computer system on which various embodiments and elements of the fTPM, as described herein, may be implemented. It should be noted that any boxes that are represented by broken or dashed lines in FIG. 6 represent alternate embodiments of the simplified computing device, and that any or all of these alternate embodiments, as described below, may be used in combination with other alternate embodiments that are described throughout this document.

For example, FIG. 6 shows a general system diagram showing a simplified computing device 600. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the fTPM, the device should have a sufficient computational capability and system memory 620 to enable basic computational operations along with system firmware 625 (or other firmware accessible memory or storage from which the fTPM is instantiated into protected system memory 620). In particular, as illustrated by FIG. 6, the computational capability is generally illustrated by one or more processing unit(s) 610, and may also include one or more GPUs 615, either or both in communication with system memory 620. Note that that the processing unit(s) 610 of the general computing device 600 may be specialized microprocessors, such as a DSP, a VLIW, or other microcontroller, or can be conventional CPUs having one or more processing cores, including specialized GPU-based cores in a multi-core CPU.

In addition, the simplified computing device of FIG. 6 may also include other components, such as, for example, a communications interface 630. The simplified computing device of FIG. 6 may also include one or more conventional computer input devices 640 (e.g., pointing devices, keyboards, audio input devices, video input devices, haptic input devices, devices for receiving wired or wireless data transmissions, etc.). The simplified computing device of FIG. 6 may also include other optional components, such as, for example, one or more conventional computer output devices 650 (e.g., display device(s) 655, audio output devices, video output devices, devices for transmitting wired or wireless data transmissions, etc.). Note that typical communications interfaces 630, input devices 640, output devices 650, and storage devices 660 for general-purpose computers are well known to those skilled in the art, and will not be described in detail herein.

The simplified computing device of FIG. 6 may also include a variety of computer readable media. Computer readable media can be any available media that can be accessed by computing device 600 via storage devices 660 and includes both volatile and nonvolatile media that is either removable 670 and/or non-removable 680, for storage of information such as computer-readable or computer-executable instructions, data structures, applications, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, applications, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, applications, software, programs, and/or computer program products embodying the some or all of the various embodiments of the fTPM described herein, or portions thereof, may be stored, received, transmitted, or read from any desired combination of computer or machine readable media or storage devices and communication media in the form of computer executable instructions or other data structures.

Finally, the fTPM described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Firmware-Based TPM has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Firmware-Based TPM. It is intended that the scope of the invention be limited not by this detailed description, but rather by the claims appended hereto.

What is claimed is:

1. A method for enabling a trusted execution environment (TrEE) in computing devices without a hardware trusted platform module (TPM) component, comprising steps for:
    retrieving an fTPM (firmware-based TPM) software module from a firmware component of a computing device, said fTPM providing a software-based interface to security extension functionality integral to one or more processors in the computing device;
    retrieving a software-based Monitor module from the firmware component of the computing device;
    instantiating the fTPM and the Monitor into a Secure World environment within protected memory of the computing device prior to booting an operating system (OS) on the computing device;
    wherein one or more of the processors use an ARM (advanced RISC machine)-based processor architecture, and wherein the security extension functionality integral to the ARM-based processors includes TrustZone-type security extensions and security primitives that are used by fTPM following instantiation of the fTPM; and
    enabling a TrEE on the computing device by allowing a Caller in a Normal World environment to access the security functionality of the one or more processors via a Secure Monitor Call to the Monitor, said Monitor then passing instructions relating to the Secure Monitor Call to the fTPM in the Secure World.

2. The method of claim 1 wherein the fTPM is accessible by one or more virtual machines running on the computing device.

3. The method of claim 1 fTPM code integrity is validated prior to instantiating the fTPM into the Secure World environment within the protected memory of the computing device.

4. The method of claim 1 wherein, prior to OS boot, the Caller module includes a pre-boot application module for exposing the TrEE to one or more pre-boot applications thereby allowing those applications to perform tasks using the TrEE.

5. The method of claim 1 wherein, subsequent to OS boot, the Caller module includes a TPM driver module for exposing the TrEE to one or more applications running on the OS thereby allowing those applications to perform tasks using the TrEE.

6. The method of claim 1 wherein the firmware component of the computing device receives the fTPM module by updating the firmware with software that includes the fTPM module.

7. The method of claim 1 wherein communications between the Caller and the Monitor are synchronous.

8. The method of claim 1 wherein communications between the Caller and the Monitor are asynchronous.

9. A system for implementing a trusted computing environment on a computing device without a hardware trusted platform module (TPM) component, comprising:
    a non-volatile memory component of a computing device having an fTPM (firmware-based TPM) software module stored therein, said fTPM module providing a software-based interface to security extension functionality integral to one or more processors in the computing device;
    wherein the non-volatile memory component further includes a software-based Monitor module;
    a device for reading the fTPM and the Monitor from the non-volatile memory component and instantiating the fTPM and the Monitor into a Secure World environment within protected memory of the computing device;
    wherein one or more of the processors use an ARM (advanced RISC machine)-based processor architecture, and wherein the security extension functionality integral to the ARM-based processors includes TrustZone-type security extensions and security primitives that are used by fTPM following instantiation of the fTPM; and
    enabling a trusted computing environment on the computing device by allowing a Caller in a Normal World environment to access the security functionality of the one or more processors via a Secure Monitor Call to the Monitor, said Monitor then passing instructions relating to the Secure Monitor Call to the fTPM in the Secure World.

10. The system of claim 9 wherein, prior to operating system (OS) boot, the Caller module includes a pre-boot application module for exposing the trusted computing environment to one or more pre-boot applications thereby allowing those applications to perform tasks using the trusted computing environment.

11. The system of claim 9 wherein, subsequent to operating system (OS) boot, the Caller module includes a TPM driver module for exposing the trusted computing environment to one or more applications running on the OS thereby allowing those applications to perform tasks using the trusted computing environment.

12. The system of claim 9 further comprising a device for enabling both synchronous and asynchronous communications between the Caller and the Monitor.

13. A computer-readable storage device having computer executable instructions stored therein for implementing a trusted computing environment with a computing device without a hardware trusted platform module (TPM) component, said instructions comprising:

an fTPM (firmware-based TPM) software module for providing a software-based interface to security extension functionality integral to one or more processors in a computing device, and a software-based Monitor module;

loading the fTPM and the Monitor into a non-volatile memory component of the computing device;

retrieving the fTPM and the Monitor from the non-volatile memory;

instantiating the fTPM and the Monitor into a Secure World environment within protected memory of the computing device;

enabling a trusted computing environment on the computing device by allowing a Caller in a Normal World environment to access the security functionality of the one or more processors via a Secure Monitor Call to the Monitor, said Monitor then passing instructions relating to the Secure Monitor Call to the fTPM in the Secure World; and wherein, prior to operating system (OS) boot, the Caller module includes a pre-boot application module for exposing the trusted computing environment to one or more pre-boot applications thereby allowing those applications to perform tasks using the trusted computing environment.

14. The computer-readable storage device of claim 13 wherein one or more processors in the computing device use an ARM (advanced RISC machine)-based processor architecture, and wherein the security extension functionality integral to the ARM-based processors includes security extensions and security primitives.

15. The computer-readable storage device of claim 13 wherein, subsequent to operating system (OS) boot, the Caller module includes a TPM driver module for exposing the trusted computing environment to one or more applications running on the OS thereby allowing those applications to perform tasks using the trusted computing environment.

16. The computer-readable storage device of claim 13 wherein one or more of the processors contain two or more cores, and wherein a separate fTPM is instantiated within the protected memory of the computing device for each of two or more of those cores.

17. The computer-readable storage device of claim 13 further comprising a device for enabling both synchronous and asynchronous communications between the Caller and the Monitor.

* * * * *